United States Patent [19]

Tanaka et al.

[11] 4,337,995
[45] Jul. 6, 1982

[54] SWITCH FOR OPTICAL TRANSMISSION LINES

[75] Inventors: Toshiki P. Tanaka, Tokyo; Minoru Maeda, Hinode; Satoshi Aoki, Akigawa; Shoji Yamada, Hachiouji, all of Japan

[73] Assignees: Hitachi, Ltd.; Hitachi Cable, Ltd., both of Tokyo, Japan

[21] Appl. No.: 92,513

[22] Filed: Nov. 8, 1979

[30] Foreign Application Priority Data

Nov. 17, 1978 [JP] Japan ............... 53-141166

[51] Int. Cl.³ ............................................ G02B 7/26
[52] U.S. Cl. ................................................ 350/96.20
[58] Field of Search ............... 350/96.20; 250/229, 250/227

[56] References Cited

U.S. PATENT DOCUMENTS

| 4,148,558 | 4/1979 | Schuck | 350/96.20 |
| 4,152,043 | 5/1979 | Albanese | 350/96.20 |
| 4,189,206 | 2/1980 | Terai et al. | 350/96.20 |
| 4,204,744 | 5/1980 | Wittmann | 350/96.20 |

FOREIGN PATENT DOCUMENTS 52-49848  4/1977  Japan ............... 350/96.20

OTHER PUBLICATIONS

Comerford, "Fiber-Optic Bypass Switch", *IBM Tech. Discl. Bull.*, vol. 21, No. 10, Mar. 1979, pp. 4280-4281.
Y. Fujii et al., "Low-Loss 4×4 Optical Matrix Switch for Fibre-Optic Comm.", in *Electronics Letts.*, vol. 15, No. 14, Jul. 1979, pp. 427-428.

*Primary Examiner*—John D. Lee
*Attorney, Agent, or Firm*—Craig and Antonelli

[57] ABSTRACT

Disclosed is an optical switch for changing over the mode connecting two optical transmission lines comprising two optical fibers directly to each other and the mode connecting an optical communication device between the two transmission lines. In this optical switch, in order to reduce the insertion loss, first, second, third and fourth optical fibers, each having an optical connector attached to one end, are attached to a substrate so that at least parts of the respective optical fibers are fixed to the substrate, and the ends of the first and second fibers are arranged on the substrate movably so that the end face of the first optical fiber confronts the end faces of the second and third optical fibers and the end face of the second optical fiber confronts the end faces of the first and fourth optical fibers.

13 Claims, 10 Drawing Figures (a)

(b)

SWITCH FOR OPTICAL TRANSMISSION LINES

BACKGROUND OF THE INVENTION (1) Field of the Invention

The present invention relates to an optical switch using optical fibers. More particularly, the invention relates to a switch to be used for four optical transmission lines.

(2) Description of the Prior Art

In a configuration of a data transmission system in which a main station and several sub-stations are connected with one loop bus transmission line, a switch should inevitably be disposed to secure a signal line between two adjacent stations when troubles occur in the station or at the time of maintenance. As the switch to be used for this purpose, a switch in which the switching action performed by moving optical fibers directly attracts attention because it has a small size and the switching speed is high, and there has been proposed a switch in which optical fibers are arranged on the reed element of an electrical reed relay so as to render the optical fibers movable and switching is performed electro-magnetically.

Know switches of this type are of the one input-multiple output type, and when such switches are used for switching in four lines, there should inevitably be employed a pair of two switches of one input-two output type and as described in detail hereinafter, a disadvantage of the insertion loss is significant and causes a practically important problem.

SUMMARY OF THE INVENTION

It is a primary object of the present invention to provide an optical switch for optical transmission lines in which the insertion loss is reduced, more particularly an optical switch for four optical fiber lines (RX/TX mode and bypass mode) in which the insertion loss is reduced, wherein the RX/TX mode is one of switching modes in which the incoming transmission line and outgoing transmission line are connected to a receiver (RX) and a transmitter (TX), respectively.

In accordance with the present invention, this object can be attained by an optical switch which comprises first, second, third and fourth optical fibers, each having an optical connector at one end and an end face cut in good optical conditions on the other end, a substrate having a space where ends of the first and second optical fibers can be moved by bending, and means for moving the first and second optical fibers so that the end faces of the first and second optical fibers confront the end faces of the third and fourth optical fibers, respectively or the end face of the first optical fiber confronts the end face of the second optical fiber. In this switch, the four optical fiber lines are switched between the RX/TX mode and bypass mode by the above-mentioned moving means. When the optical switch for optical transmission lines according to the present invention is employed, the number of connecting members such as optical connectors can be reduced as compared with the number of connecting members in the conventional switch for switching between the RX/TX mode and bypass mode comprising 2 switches of the one input-two output type, and therefore, the insertion loss can be remarkably reduced.

The first and second optical fibers may be made to confront each other not only by way of a butt joint but also through an intermediate optical fiber.

Other objects and features of the present invention will be apparent from the following description made with reference to the accompanying drawings.

DETAILED DESCRIPTION OF THE PREFERRED EMBODIMENTS

Figure 1:
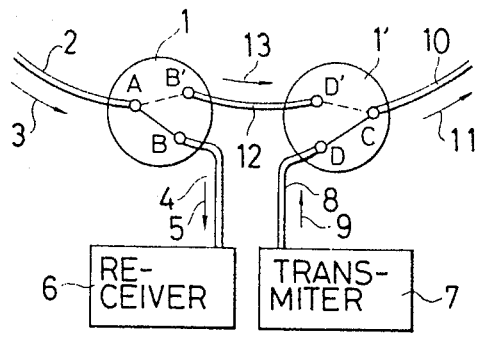
FIG. 1 is a diagram illustrating the switch for switching between the RX/TX mode and bypass mode.

FIG. 1 illustrates one sub-station in the optical fiber transmission system in a loop configuration, which is one main application field of the present invention. Ordinarily, optical switches 1 and 1' connect terminals A and C to terminals B and D, respectively. An optical signal propagated in the direction of arrow 3 through an optical fiber 2 as the main transmission line is applied to an optical receiver 6. The received signal is processed with predetermined processing and after delivery of necessary information, the optical signal is fed into an optical fiber 8 by an optical transmitter 7 and is returned to a main transmission fiber 10. In short, the optical signal flows through a course of 3→5, 9→11. This is called the "RX/TX mode". When trouble occurs in the receiver or transmitter for some reason or other, or when the substation is inspected for maintenance, the switches 1 and 1' are switched so that they connect terminals A and C to B' and D', respectively, and main transmission lines 2 and 10 are connected to each other through an optical fiber 13 so that the optical signal flows through a course of 3→13→11. This is called the "bypass mode".

Figure 2:
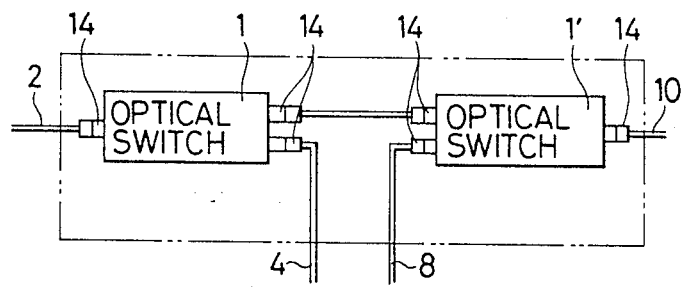
FIG. 2 is a diagram illustrating a similar structure formed by combining switches of the one input-two output type.

If a switch system similar to that shown in FIG. 1 is constructed by employing a reed relay type one input-two output switch, a structure as shown in FIG. 2 is formed. Namely, a pair of one input-two output type switches must be used for one sub-station.

The optical transmission system using optical fibers involves a problem of transmission loss in comparison to the case of an electrical transmission line. Particularly, the loss at connecting points cannot be neglected. Therefore, the insertion loss should be reduced in optical switches to a level as low as possible, and various optical connectors have heretofore been proposed as means for reducing the insertion loss.

In the case where a pair of one input-two output type switches are used as shown in FIG. 2, the loss of the optical switch is 2Lc+Ls [dB] in the RX-TX mode and 4Lc+2Ls [dB] in the bypass mode, where Ls [dB] represents the connection loss of the joint of the fibers in the switches 1 and 1' and Lc [dB] represents the connection loss in the optical connector 14.

Figure 3:
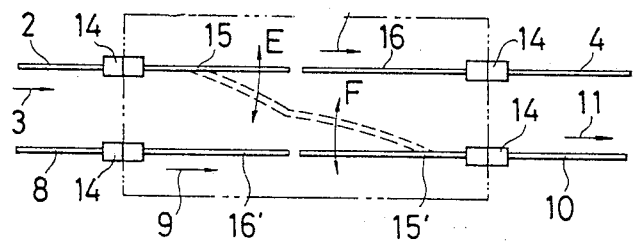
FIGS. 3 to 9 are diagrams illustrating the structures of embodiments of the switch for optical transmission lines according to the present invention.

FIG. 3 shows the main connecting portion in one embodiment of the switch for optical fiber transmission lines according to the present invention. Elements having the same functions as in FIGS. 1 and 2 are indicated by the same reference numerals. As shown in FIG. 3, the optical switch comprises first, second, third and fourth switching optical fibers 15, 15', 16 and 16' (hereinafter referred to as "optical fibers"), each having one end connected to the optical connector 14, and the first and second optical fibers 15 and 15' are arranged so that the ends of these optical fibers are movable as indicated by E and F in FIG. 3. The positions of the optical fibers in the RX/TX mode are indicated by solid lines and those in the bypass mode are indicated by dotted lines. In this structure, the insertion loss is 2Lc+Ls [dB] in the RX/TX mode as in the structure shown in FIG. 2 but the insertion loss in the bypass mode is 2Lc+Ls [dB], which is ½ of the insertion loss in the structure shown in FIG. 2.

Figure 4:
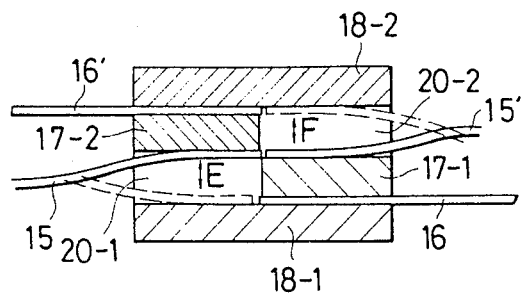
Figure 5:
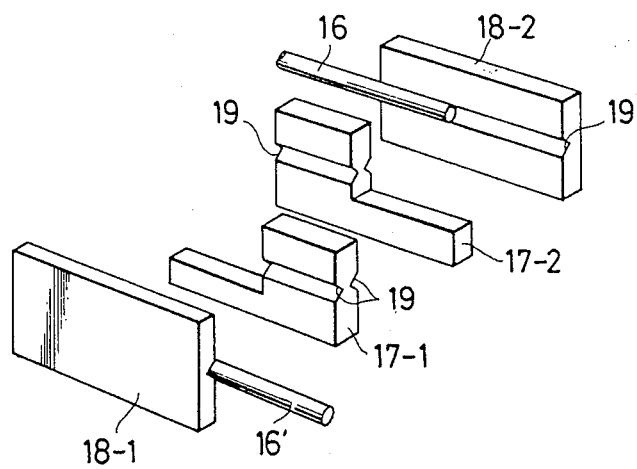

FIGS. 4 and 5 are sectional side and partial fragmentary perspective views showing the positioning portion for the optical fibers in the above-mentioned embodiment. As shown in FIGS. 4 and 5, substrates 18-1, 17-1, 17-2 and 18-2, each having a highly precisely processed V-shaped groove 19, are combined so that the V-shaped grooves are located on the same plane, and on this same plane, spaces 20-1 and 20-2 are opened so that the end portions of the optical fibers 15 and 15' can be moved in these spaces 20-1 and 20-2. Each of the third and fourth optical fibers 16 and 16' is fixed and gripped between two grooves.

Figure 10:
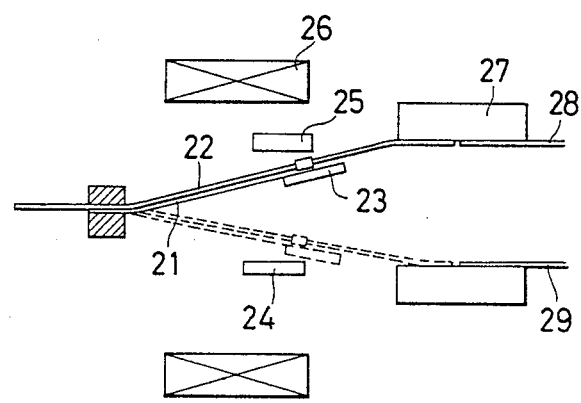
FIG. 10 is a diagram showing one embodiment of the driving mechanism which is used in the foregoing embodiments.

A structure as shown in FIG. 10 may be adopted for the driving mechanism for moving the movable fibers. More specifically, a movable fiber 22 is arranged on a flat spring 21 having one end fixed, and a ferromagnetic member 23 composed of Permalloy or the like is attached to a part of the flat spring 21. In the ordinary state, the movable fiber is pressed to a positioning portion 27 by a stopper 25 and is connected to a fixed fiber 28. When an electric current is applied through an exciting coil 26, a fixed ferromagnetic member 24 also acting as a stopper and the ferromagnetic member 23 attached to the flat spring are magnetized and by attractive forces of these ferromagnetic members 23 and 24, the flat spring and fiber are shifted to the positions indicated by dotted lines, and the movable fiber becomes connected to another fixed fiber. Of course, the driving mechanism for movable fibers is not limited to the embodiment shown in FIG. 10.

Figure 6:
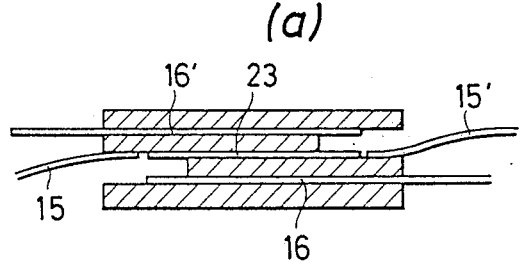

FIGS. 6(a) and 6(b) are sectional views illustrating the main part of another embodiment of the switch for optical fiber transmission lines according to the present invention. As is seen from the drawings, this embodiment is different from the embodiment shown in FIGS. 3 to 5 in that at the time of switching to the bypass mode, a connecting fiber 23 is interposed between movable fibers 15 and 15' (first and second fibers). Other structural features of this embodiment are substantially the same as those of the above-mentioned embodiment. Reduction of the insertion loss in this invention is slightly inferior to that attained in the embodiment shown in FIG. 3, but a simple rectangular substrate may be used instead of the substrate having a V-shaped groove as shown in FIG. 4. In the embodiment shown in FIG. 4, in order to lessen the spacing between the end faces of the movable and fixed fibers, a high precision is required for arrangement or dimensions of the movable portion and the positioning portion to which the fixed fiber is attached. In the embodiment shown in FIGS. 6(a) and 6(b), the arrangement and positioning can be accomplished relatively easily.

Figure 7:
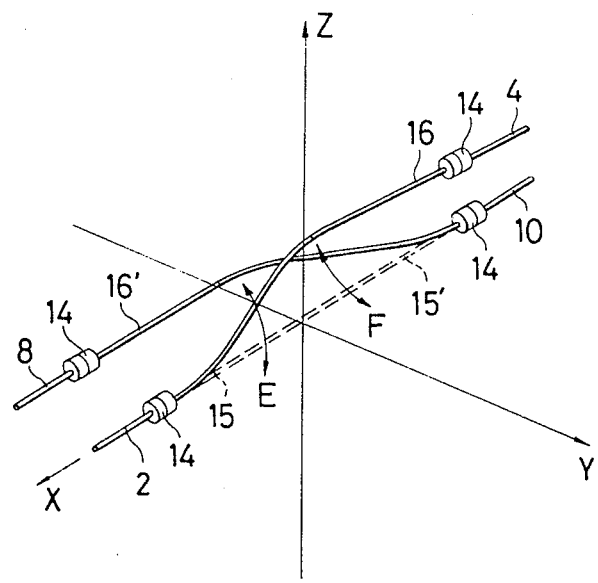
Figure 8:
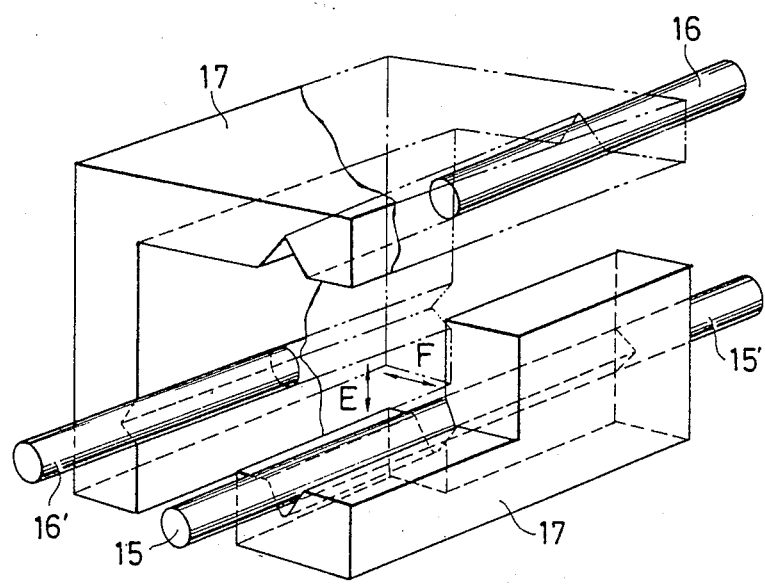
Figure 9:
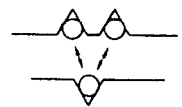
Figure 9:
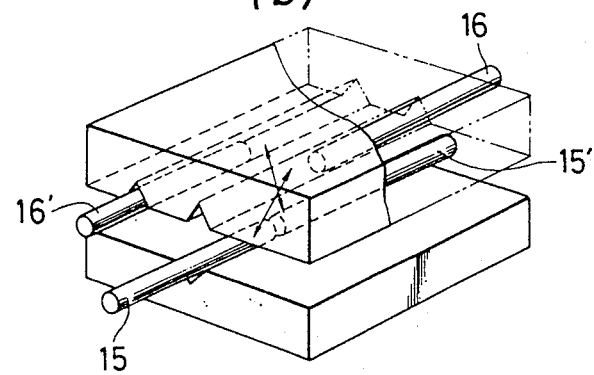

FIGS. 7, 8 and 9 show the structures of the main part of other embodiments of the switch for optical fiber transmission lines according to the present invention. In the foregoing embodiments shown in FIGS. 3 through 6, the first, second, third and fourth optical fibers constituting the switch are located on the same plane. In the present embodiment, the respective optical fibers are three-dimensionally arranged or movable fibers are moved three-dimensionally. The insertion loss is the same as in the embodiment shown in FIGS. 3 to 5. The basic structure of this embodiment is illustrated in FIG. 7. As is seen from FIG. 7, the movable fibers 15 and 15' are not moved on the same plane but the movable fiber 15 is moved in the plane x-z and the movable fiber 15' is moved in the plane x-y. In this embodiment, the insertion loss is 2Lc+Ls [dB] in the RX/TX mode and 2Lc+Ls [dB] in the bypass mode. That is, the insertion loss in the bypass mode is reduced below the insertion loss in the conventional switch constructed by integrating a pair of one input-two output switches.

FIG. 8 is a perspective view showing the structure of the main part of the switch shown in FIG. 7. In the present embodiment, by switching between the RX/TX mode and the bypass mode, the movable fiber 15 is moved in the vertical direction E and the movable fiber 15' is moved in the horizontal direction F. The case where the angle defined by the moving planes of the movable fibers is 90° is shown, but this angle is not particularly critical but an optional angle may be adopted. FIGS. 9(a) and 9(b) show the structure of the main part of the switch in which the angle defined by the moving planes of the two movable fibers is smaller than 90°.

The present invention is not limited to embodiments described above, but various modifications and changes may be effected without departing from the scope defined by the following claims.

What is claimed is:

1. A switch for optical fiber transmission lines which comprises first, second, third and fourth optical fibers, a substrate to which at least parts of each of the first through fourth optical fibers are attached in such a way that an end of at least the first and second optical fibers can be moved relative to said substrate to which they are attached, and means for moving the first and second optical fibers relative to said substrate from one position where the end faces of the first and second optical fibers confront the end faces of the third and fourth optical fibers, respectively, to another position where the end face of the first optical fiber confronts the end face of the second optical fiber.

2. A switch for optical fiber transmission lines as set forth in claim 1 wherein the moving faces of the ends of the first and second optical fibers define a predetermined angle therebetween.

3. A switch for optical fiber transmission lines as set forth in claim 1 wherein said first and second optical fibers extend in axial alignment in said other position.

4. A switch for optical fiber transmission lines as set forth in claim 1 or claim 3 wherein said first, second and third optical fibers lie within a common plane when said first and second optical fibers are in said other position.

5. A switch for optical fiber transmission lines comprising first, second, third and fourth optical fibers; means for supporting said optical fibers so that the end faces of said first and second optical fibers are opposed to the end faces of said third and fourth optical fibers, respectively; and means for moving said end faces of said first and fourth optical fibers with respect to said supporting means from the position in which they oppose the end faces of said third and second optical fibers, respectively, to a position where they oppose each other.

6. A switch for optical fiber transmission lines as set forth in claim 5 wherein said first, second, third and fourth optical fibers are supported in a common plane.

7. A switch for optical fiber transmission lines as set forth in claim 5 wherein said first and second optical fibers are supported in alignment with said third and fourth optical fibers, respectively.

8. A switch for optical fiber transmission lines comprising first, second, third and fourth optical fibers; means for supporting said optical fibers so that the end faces of said second and third optical fibers are movable with respect to said supporting means between first positions where the end faces of said first and second optical fibers are opposed to the end faces of said third and fourth optical fibers, respectively, and second positions where the end faces of said second and third optical fibers oppose each other; and means for moving the end faces of said second and third optical fibers with respect to said supporting means between said first and second positions.

9. A switch for optical fiber transmission lines as set forth in claim 8 wherein said first, second, third and fourth optical fibers are supported in a common plane.

10. A switch for optical fiber transmission lines which comprises first, second, third and fourth optical fibers; a substrate having grooves supporting said optical fibers, at least parts of the optical fibers being attached to said substrate in such a way that an end of the first and second optical fibers can be moved relative to said substrate; and means for moving the first and second optical fibers relative to said substrate from respective grooves in said substrate where the end faces of the first and second optical fibers confront the end faces of third and fourth optical fibers, respectively, to other grooves where the end face of the first optical fiber confronts the end face of the second optical fiber.

11. A switch for optical fiber transmission lines as set forth in claim 10, wherein said grooves are V-shaped grooves.

12. A switch for optical fiber transmission lines as set forth in claim 10 or claim 11, wherein said moving means comprises a flat spring on which the fiber is arranged, a ferromagnetic member attached to a part of said flat spring and an exciting coil which magnetizes said flat spring and said ferromagnetic member.

13. A switch for optical fiber transmission lines as set forth in claim 10 or claim 11, wherein said substrate comprises first, second, third and fourth parts having at least one V-shaped groove, and the third fiber is disposed in the V-shaped grooves of the first and second parts, the fourth fiber is disposed in the grooves of the third and fourth parts, the first fiber moves from the V-shaped groove of the first part to the V-shaped groove of the third part and the second fiber moves from the V-shaped groove of the fourth part to the V-shaped groove of the second part.

* * * * *